May 7, 1963  S. H. CREED ET AL  3,088,508
PEAR PEELING MACHINE
Original Filed Nov. 30, 1956  8 Sheets-Sheet 1
FIG_1
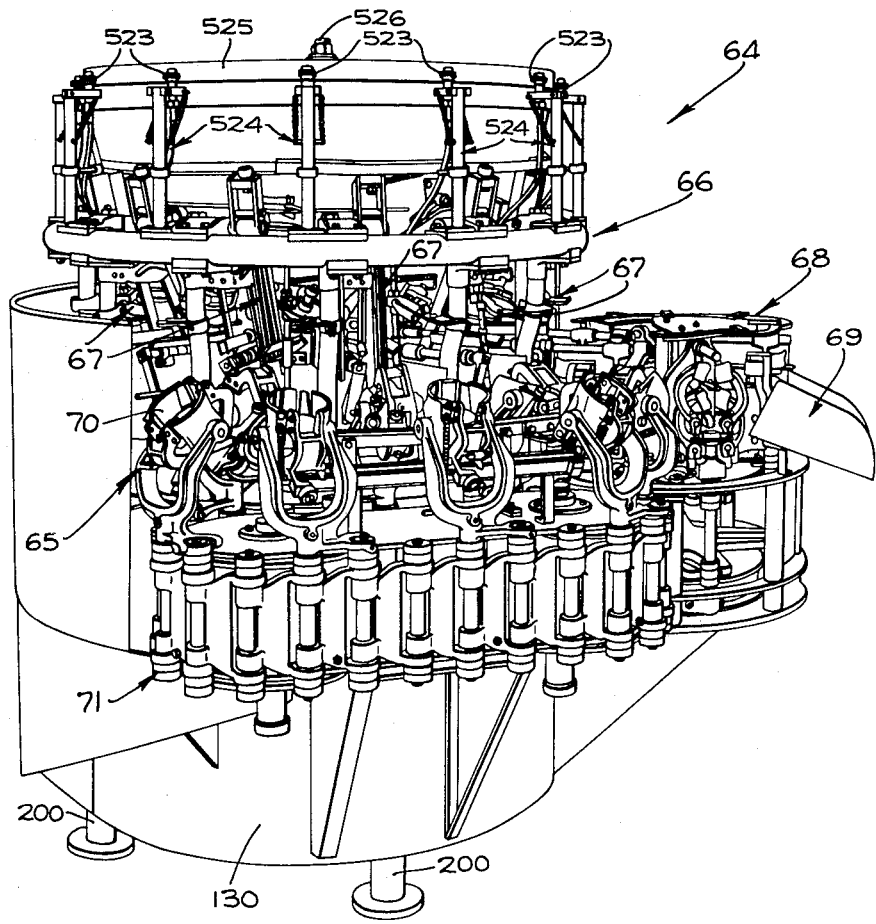
INVENTORS
SHERMAN H. CREED
SANDOR CSIMMA
BY Hans G. Hoffmeister
ATTORNEY May 7, 1963  S. H. CREED ET AL  3,088,508
PEAR PEELING MACHINE
Original Filed Nov. 30, 1956  8 Sheets-Sheet 2
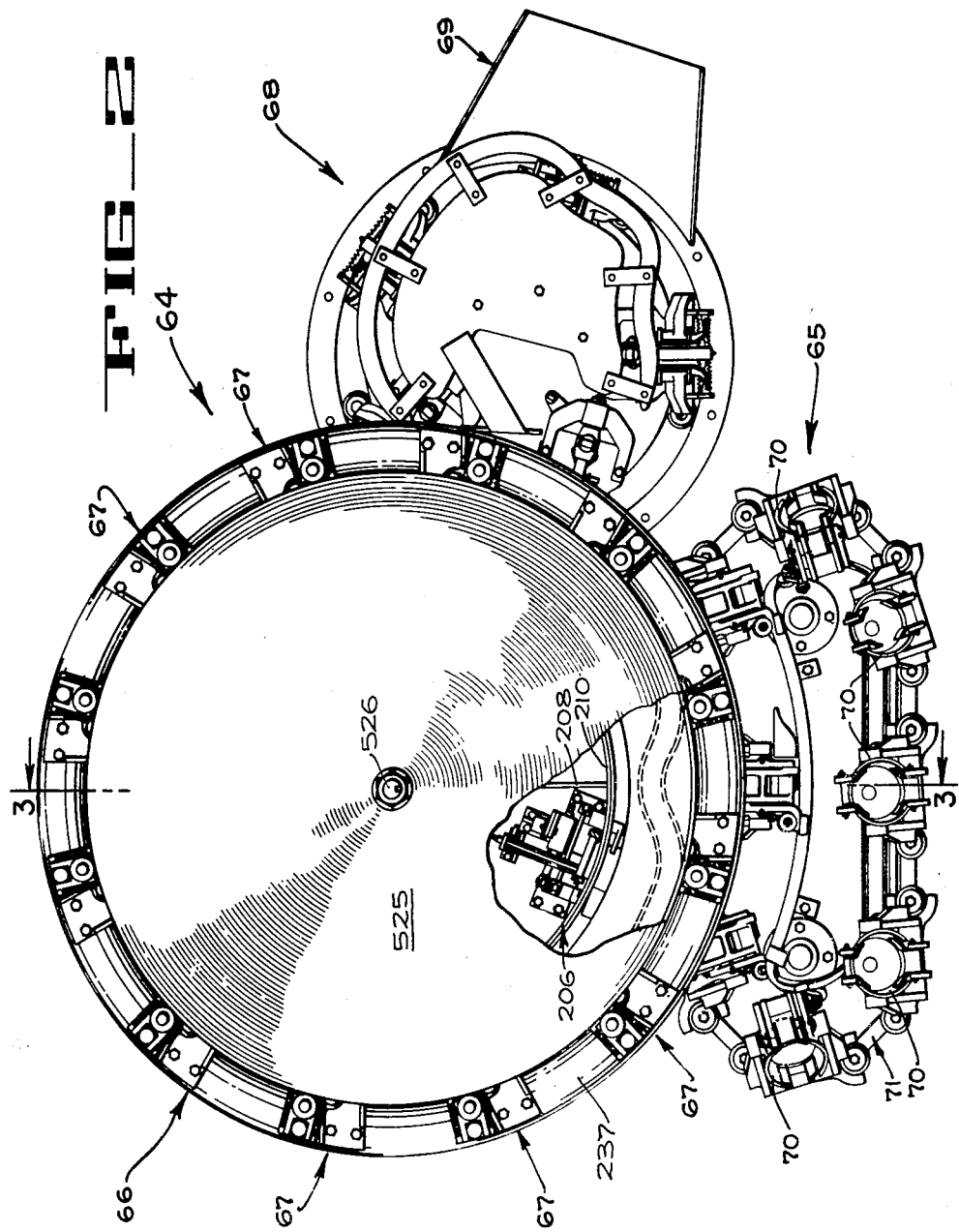
INVENTORS
SHERMAN H. CREED
SANDOR CSIMMA
BY Hans G. Hoffmeister
ATTORNEY

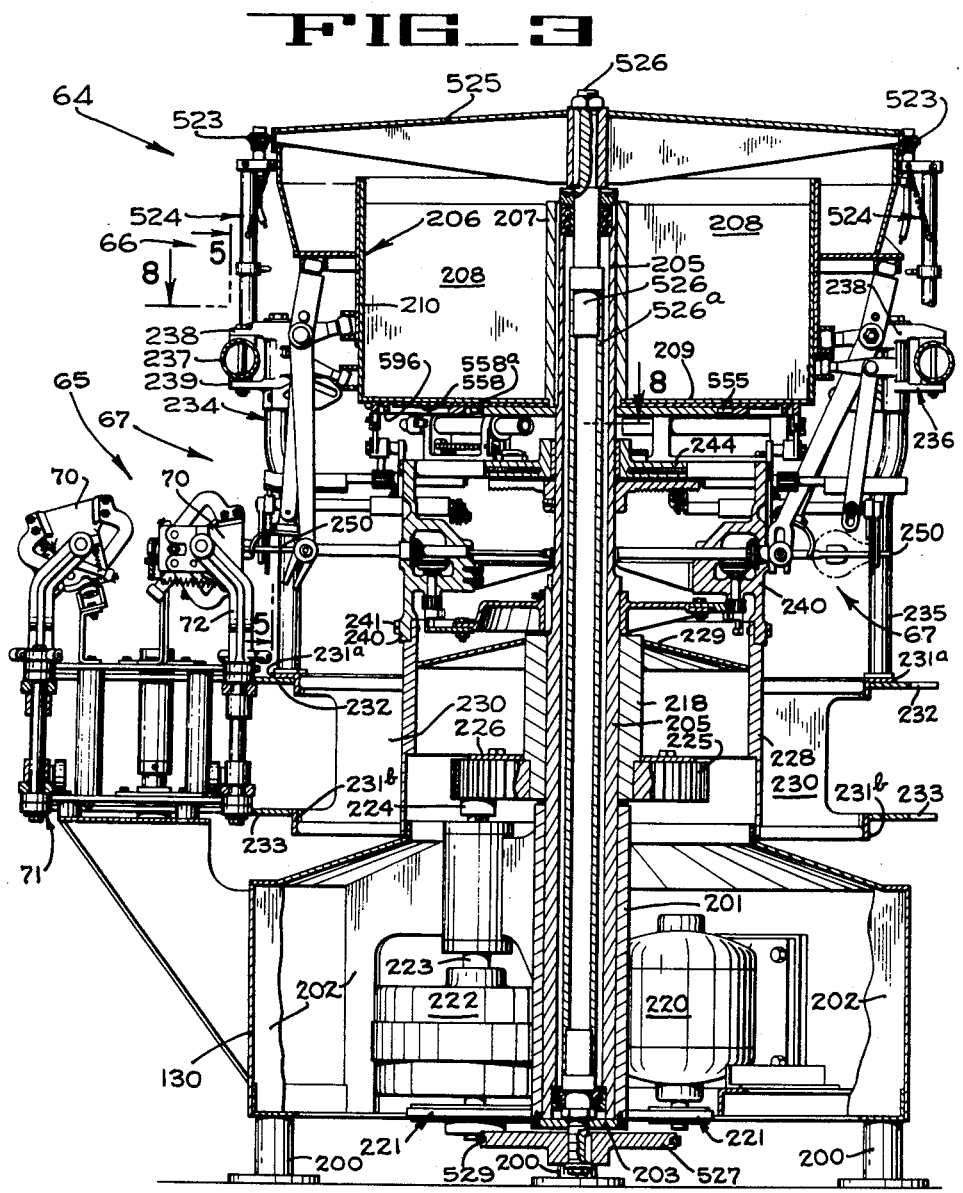

May 7, 1963  S. H. CREED ET AL  3,088,508
PEAR PEELING MACHINE
Original Filed Nov. 30, 1956  8 Sheets-Sheet 4
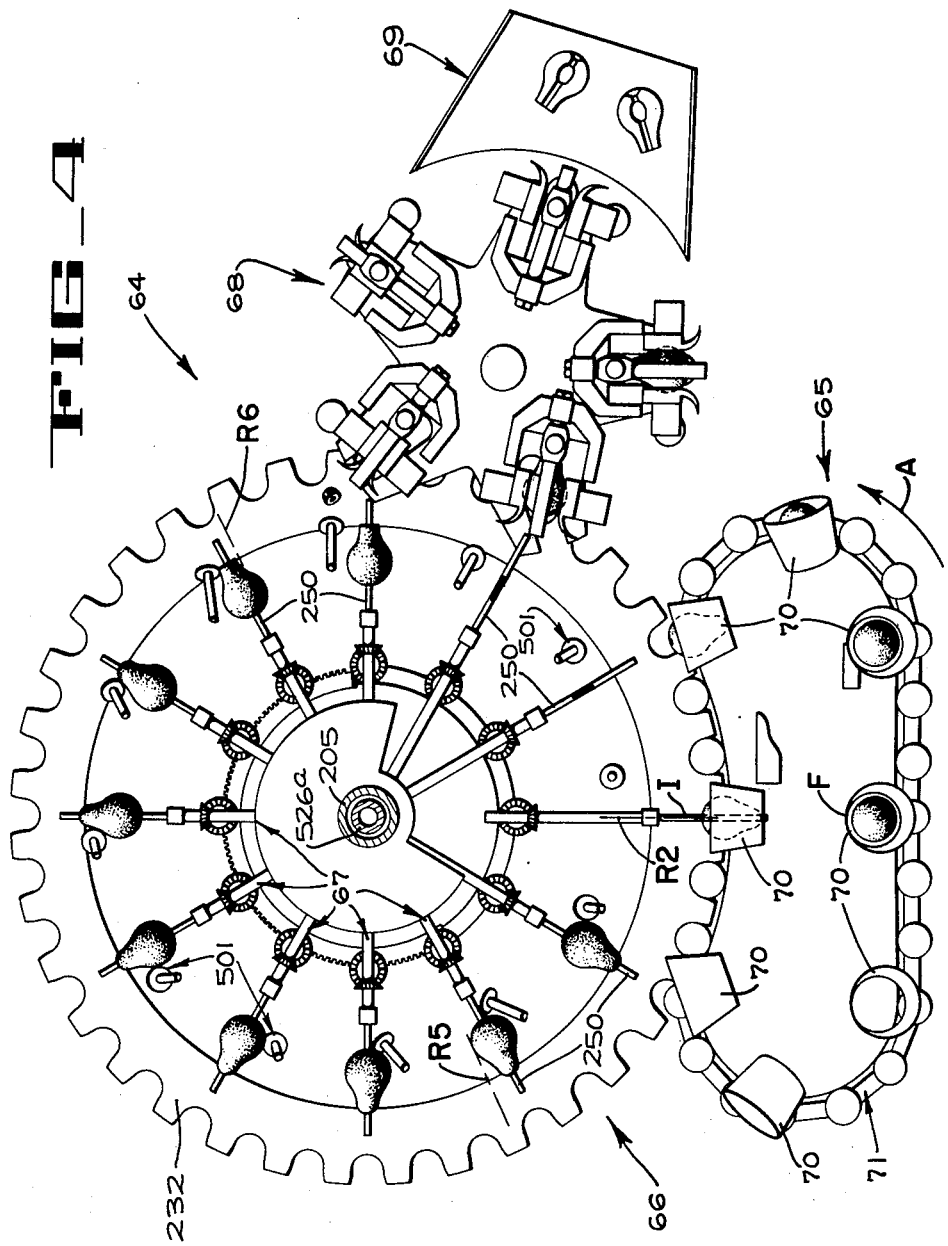
INVENTORS
SHERMAN H. CREED
SANDOR CSIMMA
BY Hans G. Hoffmeister.
ATTORNEY

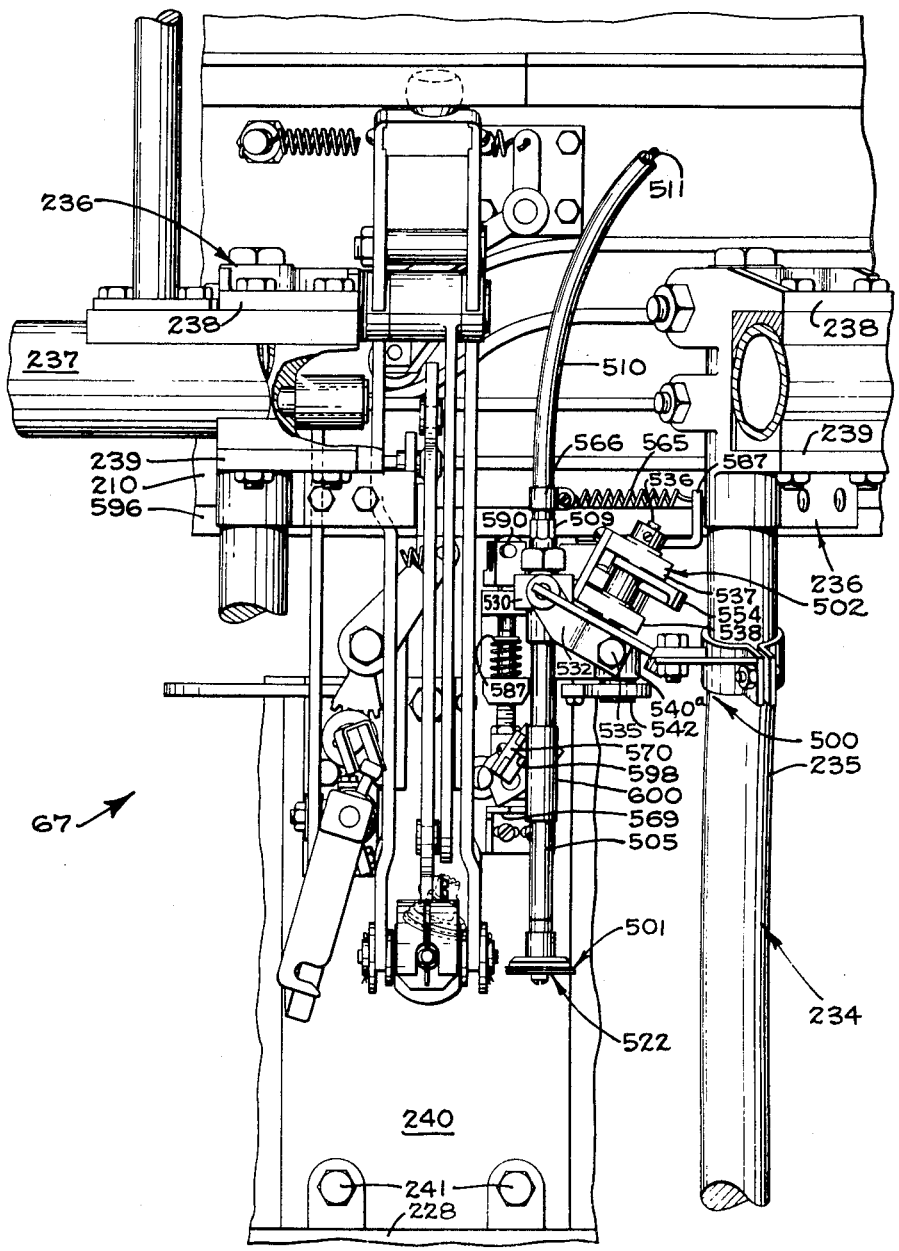

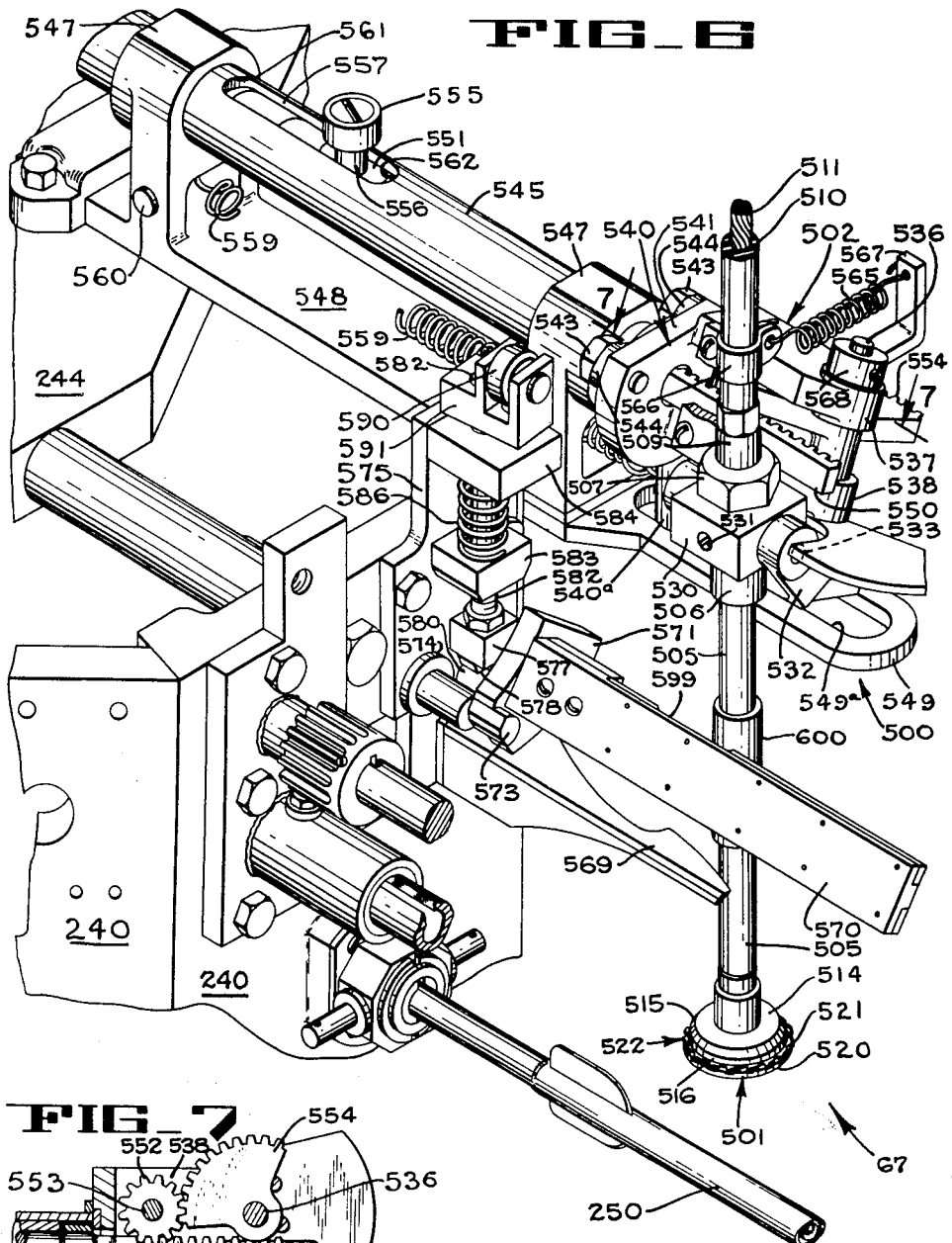

May 7, 1963   S. H. CREED ET AL   3,088,508
PEAR PEELING MACHINE
Original Filed Nov. 30, 1956   8 Sheets-Sheet 7
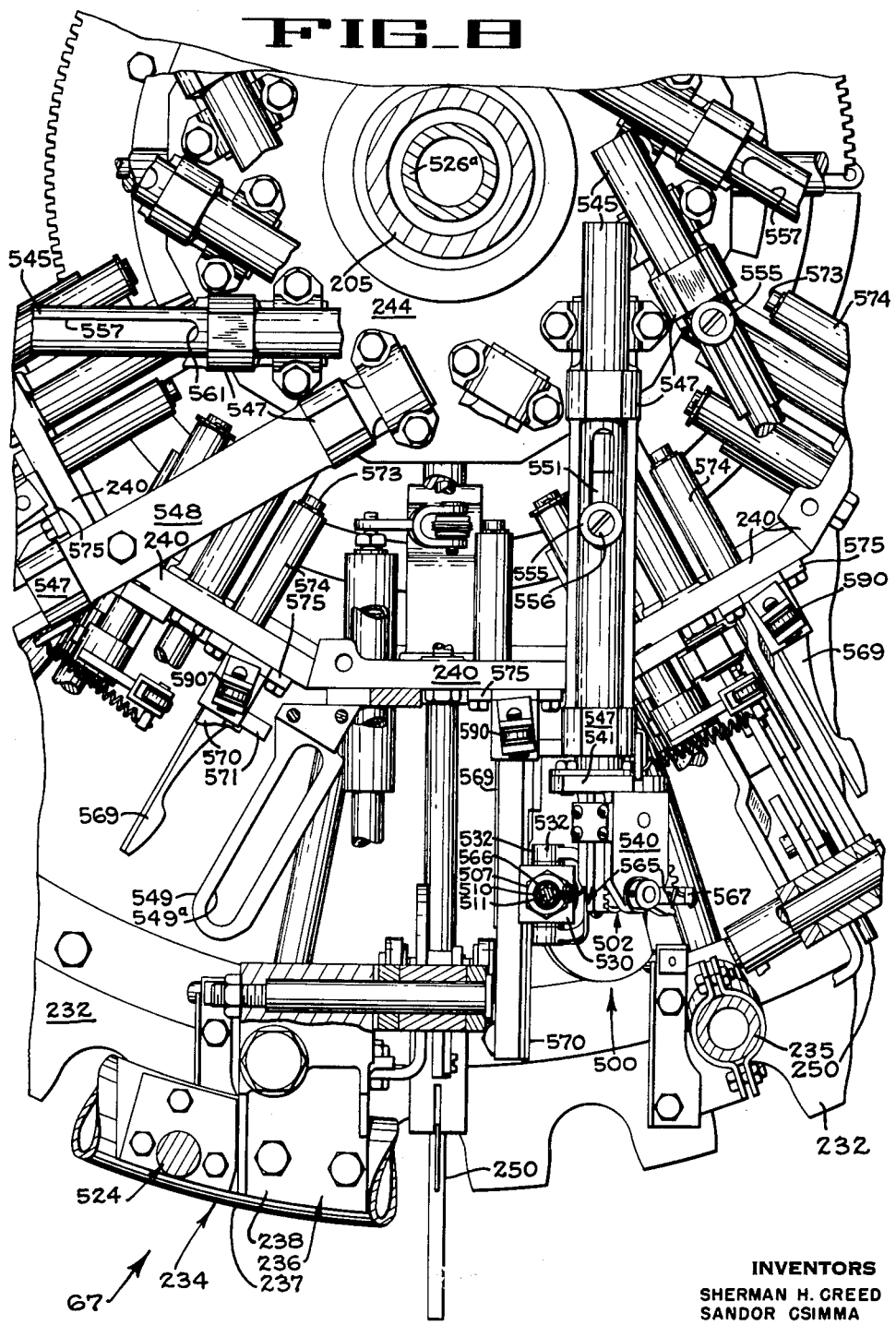
INVENTORS
SHERMAN H. CREED
SANDOR CSIMMA
BY *Hans G. Hoffmeister*
ATTORNEY

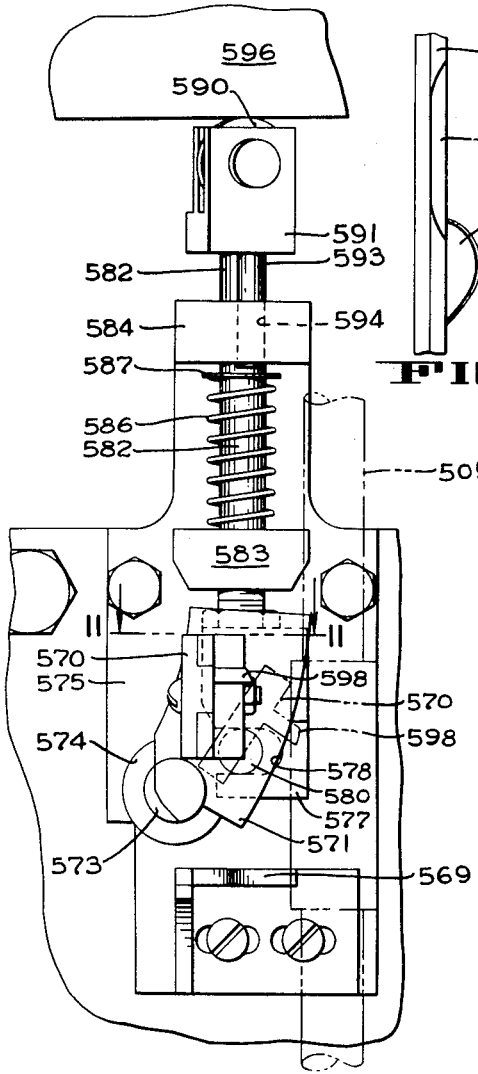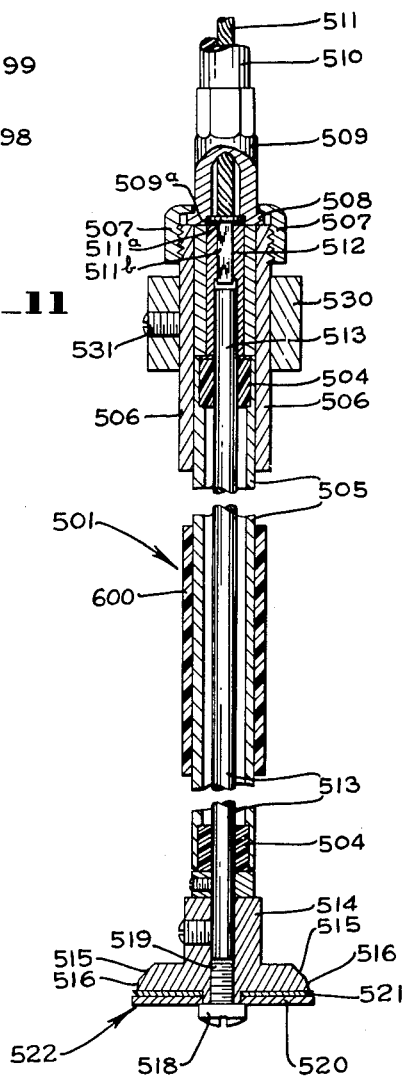
INVENTORS
SHERMAN H. CREED
SANDOR CSIMMA
BY Hans G. Hoffmeister.
ATTORNEY

United States Patent Office 3,088,508
Patented May 7, 1963

3,088,508
PEAR PEELING MACHINE
Sherman H. Creed, San Jose, and Sandor Csimma, Sunnyvale, Calif., assignors to FMC Corporation, a corporation of Delaware
Original application Nov. 30, 1956, Ser. No. 625,368, now Patent No. 2,979,093, dated Apr. 11, 1961. Divided and this application Nov. 20, 1959, Ser. No. 854,421
2 Claims. (Cl. 146—43)

This invention appertains to a fruit handling machine and more particularly relates to a fruit peeling mechanism for preparing fruit, such as pears, for canning.

This application is a division of copending application Serial No. 625,368, filed November 30, 1956, now Patent No. 2,979,093 which issued on April 11, 1961.

An object of the present invention is to provide an improved drive mechanism for a rotary cutter.

Another object is to provide an efficient control apparatus for a fruit peeling mechanism.

Other and further objects and advantages of the present invention will become apparent from the following description taken in connection with the accompanying drawings:

FIG. 1 is a perspective of the fruit preparation machine of the present invention.

FIG. 2 is a plan view of the machine of FIG. 1 with a portion broken away.

FIG. 3 is a vertical section taken on line 3—3 of FIG. 2.

FIG. 4 is a diagrammatic plan view of a portion of the operating mechanism of the machine of FIG. 1.

FIG. 5 is an enlarged fragmentary elevation of a portion of the main turret of the machine of FIG. 1 taken in the direction of arrows 5—5 of FIG. 3, particularly showing one of the several processing units on the main turret.

FIG. 6 is an enlarged fragmentary perspective of the processing unit shown in FIG. 5 with parts being omitted.

FIG. 7 is a sectional view taken on line 7—7 of FIG. 6.

FIG. 8 is an enlarged fragmentary horizontal section taken along line 8—8 of FIG. 3 with parts broken away, parts in section, and parts omitted to more clearly show the internal operating mechanisms of the machine.

FIG. 9 is an enlarged longitudinal sectional view taken centrally through the peeling cutter assembly used in the machine of the present invention.

FIG. 10 is a fragmentary side elevation of a cutter retracting mechanism.

FIG. 11 is a fragmentary plan view of the retractor bar of FIG. 10, the view being taken along lines 11—11 of FIG. 10.

The rotary pear processing machine of which the peeling mechanism of the present invention is a part, is indicated generally in FIGS. 1, 2 and 3 by the reference numeral 64 and comprises a pear feed mechanism 65, a rotary main turret 66 which carries a plurality of peeling, coring and stem-end trimming units 67, and a discharge turret 68 which receives each peeled, cored and trimmed pear from the main turret 66 and performs successive splitting, seed-cell removing, and blossom-end trimming operations prior to depositing the two halves of the pear on a discharge chute 69.

Pears are individually fed by hand, stem end down, into feed cups 70 which are mounted on an endless chain carrier 71 that moves the cups 70 in a circuitous path in the direction of the arrow A (FIG. 4). The feed cups 70 are arranged to move the pears from a feed station F where their stem-blossom axes are substantially vertical, to an impaling station I where said axes are horizontally disposed. At the impaling station I of the main turret 66, one of several stemming tubes 250 is moved radially outward of the turret 66 and impales one of the pears at its blossom end and along its stem-blossom axis. While supported on the stemming tube 250, the stem and a portion of the seed cell of the pear is removed, the pear is peeled by one of several peeling mechanisms of the present invention, and the stem end of the pear is severed from the body of the pear by a cutting blade. The above referred to parts are described in detail in the above-identified parent application to which reference may be had if necessary for a description of the entire machine.

Referring to FIG. 3, it will be noted that the machine is provided with a cylindrical base 130 that has three support posts 200 which rest on a surface such as a floor. An upright tubular member 201 is disposed concentrically of the base at the center thereof and is rigidly secured to the base by a plurality of radially extending flanges 202. An apertured plate 203 is bolted across the lower end of the tubular support member 201 and a main shaft 205 is bottomed on the plate 203 inside the stationary support member 201 to which it may be secured by any suitable means as by bolts. A cylindrical drum 206 is mounted in supported relation at the upper end of the stationary shaft 205. The drum has a central tubular member 207 and a plurality of radial webs 208 which connect the central tubular member 207 to a base plate 209 and an outer wall 210. The drum is supported by the stationary support shaft 205 and is keyed thereto so that the drum cannot rotate and, accordingly, it provides a suitable support for several stationary cams which control operating mechanisms of the machine, as will be explained presently.

In the present pear processing machine, the rotary turret 66 carries twelve separate and complete processing units 67 which are schematically shown in FIG. 4. As the turret 66 rotates clockwise, each unit removes a pear from a feed cup, firmly seats the pear on a stemming tube, peels the pear, and cuts off the stem end of the pear. By the time these operations are completed, the unit is disposed adjacent the discharge turret 68 to which the pear is transferred.

The turret 66 (FIG. 3) comprises a tubular drive member 218, which is disposed at the center of the machine around the stationary main shaft 205. The member 218 is driven by a motor 220 through a belt and pulley drive 221, a transmission unit 222, a drive shaft 223, a pinion 224 on the shaft 223, and a gear 225 that is bolted to a plate 226 (FIG. 3) which is welded to the drive member 218. Near its upper end the drive member 218 is rigidly connected to an outer cylindrical drive member 228 through a rigid, frusto-conical member 229. Thus, when the motor 220 is energized, the outer drive member 228 of the turret 66 is continuously rotated.

The outer cylindrical drive member 228 carries a plurality of vertical plates 230 which are welded to the member 228 and project radially outwardly therefrom. A circular angle bar 231a (FIG. 3) is rigidly secured around the upper, outermost edges of the plates 230, and a circular strap 231b is welded around the lower outermost edges of the plates 230. A horizontal upper sprocket ring 232 (FIGS. 3 and 4) is secured to the upper flange 231a, and a lower sprocket ring 233 (FIG. 3) is secured to the lower strap 231b. The sprocket rings 232 and 233 drive the cup carrier 71 in synchronism with the several processing units 67 on the turret 66.

A framework 234 (FIGS. 2 and 3) is formed around the drum 206 by means of a plurality of vertical tubular members 235 which are mounted in upright spaced position on the upper surface of the circular angle bar 231a. A casting 236 is bolted on the upper end of each tubular member 235, and the several castings 236 are connected together by a tubular ring 237 which is bolted between spaced arms 238 and 239 of each casting. The castings 236 provide mounting means for mechanism of each pear processing unit 67 and accordingly, one upstanding tubular member 235 is disposed radially outwardly from each processing unit 67.

On each pear processing unit 67, a peeling mechanism 500 (FIGS. 5, 6 and 8) is mounted adjacent the stemming tube 250. The peeling mechanism 500 includes a cutter assembly 501 (FIG. 6) and a cutter actuating mechanism 502 which swings the rotating cutter into position adjacent the butt end of the pear, moves the cutter up over the butt end as the butt end is peeled, and then moves the cutter longitudinally along the pear to the stem end.

The cutter assembly 501 (FIG. 9) comprises a tubular metal support shaft 505 that has a sleeve 506 welded to its upper end. A nut 507 is disposed on the threaded end of the sleeve 506 and is arranged to engage an annular flange 508 of a short ferrule 509 to lock the tube against the end of the sleeve 506. The ferrule 509 has a rubber tubular extension 510 secured thereon to form a flexible protective covering for a flexible drive shaft 511 which is connected by a coupling 512 to a shaft 513 that extends through the metal support shaft 505 and is journalled in bushings 504. The coupling 512 is pressed on the shaft 513 and has a socket of square cross-section adapted to receive a square end 511b of the shaft 511. The ferrule 509 has a shoulder 509a that is urged by the nut 507 into engagement with a collar 511a on the shaft 511 to hold the square end 511b in the square socket of the coupling 512. Set screwed to one end of the drive shaft 513 is a depth gauge 514 which has a frusto-conical gauging surface 515, and a frusto-conical guide surface 516 adjacent the gauging surface. A screw 518 is threaded into a central tapped bore 519 in the gauge 514, the head of the screw being arranged to lock a second cylindrical gauge 520 and a circular cutter 521, which has peripheral cutting teeth, to the gauge 514 to form a cutter head 522.

The flexible drive shaft 511 of each processing unit has a drive wheel 523 secured to its upper end, as seen in FIG. 3, and each drive wheel is supported from the ring 237 by a bracket 524, and is disposed in frictional engagement with a peripheral rim of a disk-like drive member 525 The drive member 525 is keyed to and supported on the upper end of a drive shaft 526, which has a tubular section 526a, and is rotatably journalled in suitable bearings in the stationary main shaft 205. At its lower end, the drive shaft 526 carries a pulley 527 which is driven from a motor (not shown) through a belt 529. During the operation of the machine, the motor is continuously energized and, accordingly, the flexible drive shaft 511 of each processing unit 67 is continuously rotated to drive its cutter head at a high rotative speed.

Each cutter assembly 501 is connected to its associated actuating mechanism 502 by means of a square block 530 (FIG. 6) which is secured by a setscrew 531 to the sleeve 506 and is pivotally mounted in a yoke 532 by pins 533 (one only being shown).

The yoke 532 is clamped by a bolt 535 (FIG. 5) around a shaft 536 (FIGS. 5 and 6) that is journalled for rotation in two spaced arms 537 and 538 of a yoke 540 that has a base member 541 (FIG. 6) secured by capscrews 543 to a flange 544 of a tubular push rod 545. The push rod 545 is slidably journalled in two spaced bushings 547 that are integrally formed on a bushing support member 548. It will be evident that, when the tubular push rod 545 is slid back and forth in the bushings 547, the yoke 540, acting through the transverse shaft 536 and the yoke 532, will carry the cutter assembly 501 in a longitudinal direction relative to a pear on the stemming tube.

The yoke 540 has an integrally formed boss 540a (FIG. 5) depending therefrom. A rotatable roller 542, which is mounted on the boss 540a, extends into a guide slot 549a (FIG. 6) in a bracket 549 that is secured to the bushing support member 548. The bushing support member 548 (FIG. 6) of a particular processing unit 67 is bolted to the upper surface of a vertical mounting plate 240, which is connected by bolts 241 (FIG. 3) to the drive member 228 of the processing unit 67 next behind, and to the upper surface of a hub plate 244 which is supported from the stationary main shaft 205 and mounted for rotation relative thereto. The engagement of the roller 542 in the slot 549a (FIG. 6) maintains the yoke 540 and the shaft 536 in a fixed orientation as the cutter is moved radially outwardly along the associated stemming tube 250.

At the beginning of the peeling operation, the cutter assembly 501 is swung from the generally vertical position of FIG. 5 to a position wherein the cutter head 522 is disposed rearwardly of the butt end of the pear and close to the stemming tube, as indicated in phantom lines in FIG. 5. To accomplish this movement, the yoke 532 is swung approximately 90 degrees about the axis of shaft 536, bringing the square block 530 outwardly and to the right from the position of FIG. 5, and moving the cutter head 522 rearwardly and to the left to the phantom line position. This 90 degree movement is effected by means of a rack 550 (FIGS. 6 and 7) formed on the end of a rod 551 that is supported for sliding movement in the tubular push rod 545. The rack 550 meshes with a pinion 552 that is rotatably mounted on a pin 553 extending between the arms 537 and 538 of the yoke 540. The pinion 552 also meshes with the teeth of a gear segment 554 which is keyed to the shaft 536. With this arrangement, when the rack 550 is withdrawn into the tubular push rod 545 from the positions shown in FIG. 6, the pinion 552 is rotated clockwise (FIG. 7) and the gear segment 554, the shaft 536, and the yoke 532 are swung counterclockwise approximately 90 degrees.

The rack is moved in and out of the tubular push rod 545 by means of a cam roller follower 555 (FIG. 6) that is mounted for rotation on a pin 556 which is fixed in the rod 551 and projects up through a slot 557 in the push rod 545. The roller follower 555 rides in a camming slot 558a (FIG. 3) that is formed in a plate 558 which is bolted to the bottom wall of the drum 206. A spring 559 (FIG. 6) is anchored at one end on a pin 560 on the base of the innermost bushing 547 and is secured at the other end to the inner face of the boss 540a of the yoke 540. This spring 559 is tensioned when the yoke 540 is moved outwardly to carry the cutter longitudinally along the pear. Accordingly, when the pear has been peeled, the spring 559 pulls the yoke rearwardly to put it in position for the next peeling operation. It will be understood that the camming slot 558a in which the follower 555 rides is so designed that just before a peeling operation is begun, the rack will be moved into the tubular push rod 545 to actuate the pinion 552 and gear segment 554 to rotate the yoke 532 in a counterclockwise direction (FIG. 7) to swing the cutter head to a position behind the butt end of the pear. When the pin 556, on which the roller follower 555 is mounted, engages the rearward edge 561 (FIG. 6) of the slot 557, the rotation of the gears and the swinging movement of the cutter head stops with the cutter head in a predetermined position adjacent the butt of the pear. Then, at the beginning of the peeling operation, the follower 555 is moved outwardly along the slot 557 of the tubular push rod 545, causing the rack and gear mechanism to swing the yoke 532 clockwise (FIG. 7) to carry the rapidly rotating cutter up over the butt end of the pear.

When the pin 556 contacts the forward edge 562 of the slot 557, the swinging movement of the cutter head is terminated and the rack and the tubular push rod 545 move outwardly as a unit, carrying the cutter longitudinally along the surface of the pear.

A spring 565 (FIG. 6) is connected between a clip 566 on the tubular extension 510 and an arm 567 extending upwardly from a collar 568 setscrewed to the shaft 536. As the cutter head moves longitudinally along the surface of the pear, the spring 565 maintains a pressure on the upper end of the shaft and swings the cutter head at the lower end into engagement with the surface of the pear.

A stop bar 569 which is secured to the vertical plate 240, limits the amount the cutter shaft can be swung inwardly so that the cutter head will not engage the stemming tube if no pear is on the tube.

When a pear is being impaled on the stemming tube 250 and when the pear is removed from the tube, the cutter assembly 501 must be held away from the stemming tube. For this purpose, a movable retractor bar 570 (FIG. 6) is mounted alongside the cutter assembly. The retractor bar, which is disposed in a position that is generally parallel to the associated stemming tube, is mounted on a short transverse arm 571 that is keyed to a pivot shaft 573. The shaft 573 is mounted for rotation in a bushing 574 that is fixed in a mounting plate 575 which is arranged to be bolted to the vertical plate 240 of the processing unit 67.

The transverse arm 571 and the retractor bar 570 are swung about the axis of the pivot shaft 573 by means of an actuating block 577 (FIG. 10) that has a recess 578 which is adapted to receive a pin 580 projecting rearwardly from the transverse arm 571. The actuating block 577 is carried at the lower end of a rod 582 that is mounted for sliding movement in two fixed guide tabs 583 and 584 projecting from the mounting plate 575. A compression spring 586 is disposed around the rod 582 between the lower guide tab 583 and a washer 587 fixed on the rod 582. The rod 582 is moved downwardly (FIG. 10) to swing the shaft 573 in a clockwise direction by means of a cam follower 590 that is rotatably mounted in a block 591 that is pinned to the upper end of the rod 582. A short guide rod 593 is also secured to the block 591 and projects downwardly into a guide hole 594 in the upper guide tab 584, to prevent rotation of the rod 582 as it is vertically reciprocated in the tabs 583 and 584. The cam follower 590 rides along the lower surface of a camming track 596 (FIG. 3) which is secured to the undersurface of the circular floor 209 of the drum 206 near the outer periphery of the floor. The cam track 596 is so designed that, at the time a pear is being positioned on the stemming tube, the cam follower 590 is depressed and the retractor bar 570 is held in the inclined, retracted, phantom line position of FIG. 10 wherein the cutter is held away from the stemming tube. When the rack and gear mechanism swings the cutter head to position behind the butt end of the pear, the cutter shaft 505 moves from a substantially vertical position to an inclined position generally parallel to the inclined bar 570. In moving to this inclined position, the cutter shaft is positioned behind a stop member 598 (FIG. 11) formed on the surface of the retractor bar adjacent a recess 599 in the bar. When the peeling operation is about to begin, the cam follower 590 is allowed to move rapidly upwardly under the urging of the spring 586. The retractor bar is swung to its vertical position, causing the stop member 598 to release the cutter shaft 505 which is then swung into contact with the butt end of the pear. After the pear is peeled and it is readily to be removed from the stemming tube, the cam follower 590 is depressed causing the retractor bar 570 to engage the shaft and swing it to the retracted position. If desired, a wear sleeve 600 (FIG. 9) may be positioned on the shaft 505 at the point where the retractor bar contacts the shaft.

In the operation of the peeling mechanism 500 it will be observed in FIG. 4 that the peeling is begun at station R5 approximately 60 degrees of turret rotation from station R2 at which the pear was withdrawn from the feed cup by the stemming tube and firmly seated thereon. Then, approximately 207 degrees of turret rotation from station R5 to R6 is used for the peeling operation.

To permit the cutter head 522 to approach the butt of the pear in order to begin the peeling operation, the rack 550 (FIG. 6) of the cutter control mechanism is retracted into the tube 545, thereby swinging the cutter head to a position closely adjacent the stemming tube 250 near the butt end of the pear, with the cutter tube 505 inclined relative to the vertical and disposed behind the butt of the pear in the phantom line position of FIG. 5. As the turret rotates, the stemming tube 250 is engaged by drive means described in the copending parent application referred to herein, and the stemming tube begins to rotate about its own axis. With the cutter head in position and the stemming tube rotating, the retractor bar 570 is swung to a vertical position (FIG. 10), disengaging the cutter tube 505 and permitting the rapidly rotating cutter head 522 to be swung into engagement with the butt end of the pear to start the peeling operation approximately at R5. During approximately the next 207 degrees of turret rotation, the cutter head peels the pear.

The stem end of the pear is then cut off, and the pear is transferred to the discharge turret 68 which performs the functions of splitting the pear, removing the seed cell from the pear and trimming the blossom-end of the pear. The discharge turrent is fully described in the copending parent application.

From the foregoing description it is apparent that the pear processing machine is provided with an inexpensive frictional drive means for rapidly rotating a cutter while the cutter head 522 travels along a path defined by the peripheral surface of the pear. A control apparatus is timed with the movement of the turret 66 to cause the cutter to begin its peeling operation at a predetermined time and to hold the cutter away from the stemming tube if a pear is not present on the stemming tube.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended hereto.

Having thus described the invention, that which is believed to be new and for which protection by Letters Patent is desired is:

1. In a fruit preparation machine, a rotary turret, a tubular body pivotally supported by said turret, a shaft journalled in said tubular body, a flexible drive member secured to one end of said shaft and extending outwardly from one end of said tubular body, a circular cutter concentric with and connected to said shaft at the other end thereof, a power driven rotary drive member concentric with and overlying said turret, said drive member including a cylindrical surface which is larger in diameter that the diameter of said turret, and a rotatable drive wheel secured to said flexible member and disposed in frictional driving engagement with said cutter.

2. In a fruit preparation machine, a rotary turret, a tubular body pivotally supported by said turret, a shaft journalled in said tubular body, a circular cutter concentric with and carried by one end of said shaft, a coupling secured to the other end of said shaft and having a socket of square cross-section, a flexible drive shaft having an end portion of square cross-section disposed in said socket, a flange on said flexible drive shaft, means operatively connected between said coupling and said flange for holding the end of said flexible drive shaft in said socket, a power driven rotary drive member concentric with and overlying said turret, said drive member including a cylindrical surface which is larger in diameter than the diameter of said turret, and a rotatable drive wheel secured to said flexible member and disposed in frictional driving engagement with said cutter.

References Cited in the file of this patent

UNITED STATES PATENTS

| | | |
|---|---|---|
| 1,591,860 | McGinnis | July 6, 1926 |
| 1,861,084 | Goranson et al. | May 31, 1932 |
| 2,089,502 | Polk | Aug. 10, 1937 |
| 2,489,195 | Polk et al. | Nov. 22, 1949 |
| 2,627,884 | Polk et al. | Feb. 10, 1953 |
| 2,891,591 | Boyce | June 23, 1959 |